United States Patent
Smith et al.

(10) Patent No.: US 7,119,848 B2
(45) Date of Patent: Oct. 10, 2006

(54) TELEVISION SYSTEM

(75) Inventors: Donn Alan Smith, Boca Raton, FL (US); Anders Bjørnsøn Rørholt, Delray Beach, FL (US)

(73) Assignee: Pace Micro Technology Plc, Shipley (GB)

( * ) Notice: Subject to any disclaimer, the term of this patent is extended or adjusted under 35 U.S.C. 154(b) by 583 days.

(21) Appl. No.: 10/210,585

(22) Filed: Jul. 31, 2002

(65) Prior Publication Data

US 2003/0028880 A1   Feb. 6, 2003

(30) Foreign Application Priority Data

Aug. 1, 2001   (GB) ................... 0118722.8

(51) Int. Cl.
*H04N 5/445*   (2006.01)
*G06F 3/00*   (2006.01)

(52) U.S. Cl. .................. 348/564; 348/569; 725/43; 345/800

(58) Field of Classification Search ............... 348/569, 348/460, 461, 468, 474; 725/43, 44, 40; 345/788, 798, 800, 815
See application file for complete search history.

(56) References Cited

U.S. PATENT DOCUMENTS 5,541,662 A * 7/1996 Adams et al. .............. 348/460
5,596,373 A * 1/1997 White et al. ................ 348/569

* cited by examiner

*Primary Examiner*—Michael H. Lee
(74) *Attorney, Agent, or Firm*—Head, Johnson & Kachigian

(57) ABSTRACT

A television system is provided which includes a display screen connected to or integrally formed with a broadcast data receiver (BDR). The BDR receives data from a broadcaster at a remote location and decodes the data to form video, audio and/or auxiliary data. At least part of the decoded data is used to generate first and second windows (4, 6, 8, 20, 22) on the display screen and one or more of the windows contain user selectable options. Upon user selection of a particular option (24) from the first window, at least a part of the first or second windows (4, 6, 8, 20, 22) are reconfigured, such that the at least part of the first window covers or disables a remaining part of the first window and/or a part or whole of the at least second window.

17 Claims, 4 Drawing Sheets

TELEVISION SYSTEM

CROSS-REFERENCE TO RELATED APPLICATION

This is an United States Application entitled "Television System" claiming priority to British Application No. 0118722.8 filed 1 Aug. 2001.

BACKGROUND OF THE INVENTION

This invention relates to a television system.

The television system referred to in the following description, which is used as an example to illustrate an application of the present invention, includes a display screen and a broadcast data receiver (BDR) connected thereto for receiving digital data from a broadcaster at a remote location via cable, satellite and/or terrestrial transmission means. The BDR decodes the data to provide visual, audio and/or auxiliary data. At least part of the decoded data is used to generate an electronic program guide (EPG) for providing information relating to various television programs and channels. EPGs are well known in the field of digital television, and provide an alternative means to conventional television listings provided in a paper format for obtaining. information relating to present and future television programs viewing.

There are many different formats in which EPGs can be displayed on a television display screen, and such display formats are often user selectable. However, a typical EPG can include a plurality of windows which are substantially simultaneously viewable as a single display. For example, one window can include a PIP or preview window for the display of a program currently being shown on a particular channel, one window can include program listings for a particular time span for one or more channels, a further window can include means for setting reminders for programs, recording programs and/or the like. At least one of the windows has user selectable options provided therein which a user can select using control means, such as a remote control handset. User selection of one or more of the options may result in the BDR generating a message on the display screen which requires a user.

The pop-up window is a new window which is generated and superimposed over the existing windows on the display screen to form at least a second display layer over the original layer(s). The user is unable to make any further selections from the windows in the original display layer until the user responds to the message in the pop up window of the at least second display layer. Thus the pop-up window acts to guarantee a user response to a query or message generated by the BDR.

It is an aim of the present invention to provide an alternative means of guaranteeing a user response on a display screen of a television system.

SUMMARY OF THE INVENTION

According to a first aspect of the present invention there is provided a television system including a display screen connected to or integrally formed with a broadcast data receiver (BDR), said BDR receiving data from a broadcaster at a remote location and decoding said data to form video, audio and/or auxiliary data, at least part of said decoded data being used to generate at least first and second windows on the display screen, one or more of said windows containing user selectable options and characterized in that upon user selection of a particular option from said first window, at least a part of said first or second windows are reconfigured, such that a remaining part of said reconfigured window and/or a part or whole of said other window(s) are disabled.

Disablement of a part or whole of a window following reconfiguration can include the actual disablement of the window and/or user-selectable options provided in the window such that the user is unable to select the same. Alternatively, reconfiguration can give the appearance to the user that the other windows and user-selectable options therein are disabled when in fact they are not. For example, reconfiguration of at least part of the first or second window can result in at least part of the first window covering being provided over or superimposed over a remaining part of said first window and/or a part or whole of said at least second window, thereby preventing further selection of any other user-selectable options thereon. Thus in the latter option, the only additional software programing required for the present invention is that for allowing reconfiguration of at least a part of the window in question rather than the actual disablement of any other window on the display screen.

The user can select a user-selectable option using a remote control handset, mouse, keyboard or any other conventional selection device.

Preferably the first or at least second windows are reconfigured if the user selected option in said first window results in a user response being required, such as an answer or confirmation to a query or message generated by the BDR. The answer or confirmation is performed/input into the BDR by the user using appropriate control means, such as a remote control handset.

In one embodiment at least a part of said first and/or second windows are reconfigured to cover non-selected options in said first and/or second windows. Thus, in this embodiment, for example, the first window can comprise several graphical areas and any one of these graphical areas can be reconfigured to cover or hide non-selected options in the window in one or more remaining graphical areas of the window and/or part or whole of the second window in the original display layer.

In a further embodiment the whole area of said first and or second windows are reconfigured.

Preferably the window is resized to cover in whole or part other selectable options, thereby preventing their selection until a time when the required user response has been made.

Thus the present invention provides a means of guaranteeing a user's response to a particular query by reconfiguring an existing window on the display screen, as an alternative to conventional pop-up windows which are superimposed over existing display windows as a second layer.

Preferably reconfiguration of the first and/or second windows results in resizing of the window, such as enlargement/expansion or reduction of the size of a whole or part of the window. For example, in one embodiment, the at least second window can be reduced in size to allow at least a part of the first window to cover the same. Alternatively, or in addition to, at least a part of the first window can be expanded or enlarged to cover the remaining part of the first window, a part or whole of the second window or other user-selectable options, thereby preventing their selection.

Preferably once the window is being or has been resized, a message is generated by the receiver and appears in the resized window to which a user's response is required. Alternatively the message is already provided in the window and becomes visible, becomes more prominent and/or becomes selectable when the window is resized or reconfigured.

Preferably once the user has given a required response to the message in the reconfigured window, the reconfigured window then returns to its original configuration, thereby revealing other selectable options for selection by the user.

In one embodiment the reconfiguration of the window following selection of a user option is almost instantaneous. Alternatively reconfiguration of the window is gradual to indicate to the user that other user selectable options have temporarily been taken away.

Preferably at least part of the video and/or auxiliary decoded data is used to generate an EPG for display on the display screen. The EPG provides program and/or channel information relating to present or future programs or events. The EPG typically includes the first and at least second windows forming a first display layer.

The first display layer can comprise a number of windows which overlap in whole or part, which abut each other, are separated from each other and/or the like.

According to a second aspect of the present invention there is provided a broadcast data receiver (BDR), said BDR receiving data from a broadcaster at a remote location and decoding said data to form video, audio and/or auxiliary data, at least part of said decoded data being used to generate at least first and second windows on the display screen, one or more of said windows containing user selectable options and characterized in that upon user selection of a particular option from said first window, at least a part of said first or second windows are reconfigured, such that a remaining part of said reconfigured window and/or part or whole of said other window(s) are disabled.

According to a yet further aspect of the present invention there is provided an electronic program guide (EPG) for display on a display screen, said EPG display providing information relating to a number of television programs and/or channels, said EPG generated via a broadcast data receiver which is connected to or integrally formed with the display screen and which receives digital data from a broadcaster at a remote location and decodes the data, at least part of said decoded data being used to generate said EPG, said EPG display including a number of windows containing user selectable options and characterized in that upon user selection of a particular option from said first window, at least a part of said first or second windows are reconfigured, such that a remaining part of said reconfigured window and/or a part or whole of said other window(s) are disabled.

The advantage of the present invention is that the selected options window need only expand to cover other selectable options and therefore is not superimposed over all windows. This therefore allows other windows to be viewed at the same time as viewing the expanded window and this is not typically allowed with conventional pop-up windows.

DESCRIPTION OF THE DRAWINGS

An embodiment of the present invention will now be described with reference to the accompanying figures wherein.

DESCRIPTION OF THE PREFERRED EMBODIMENTS

Figure 1:
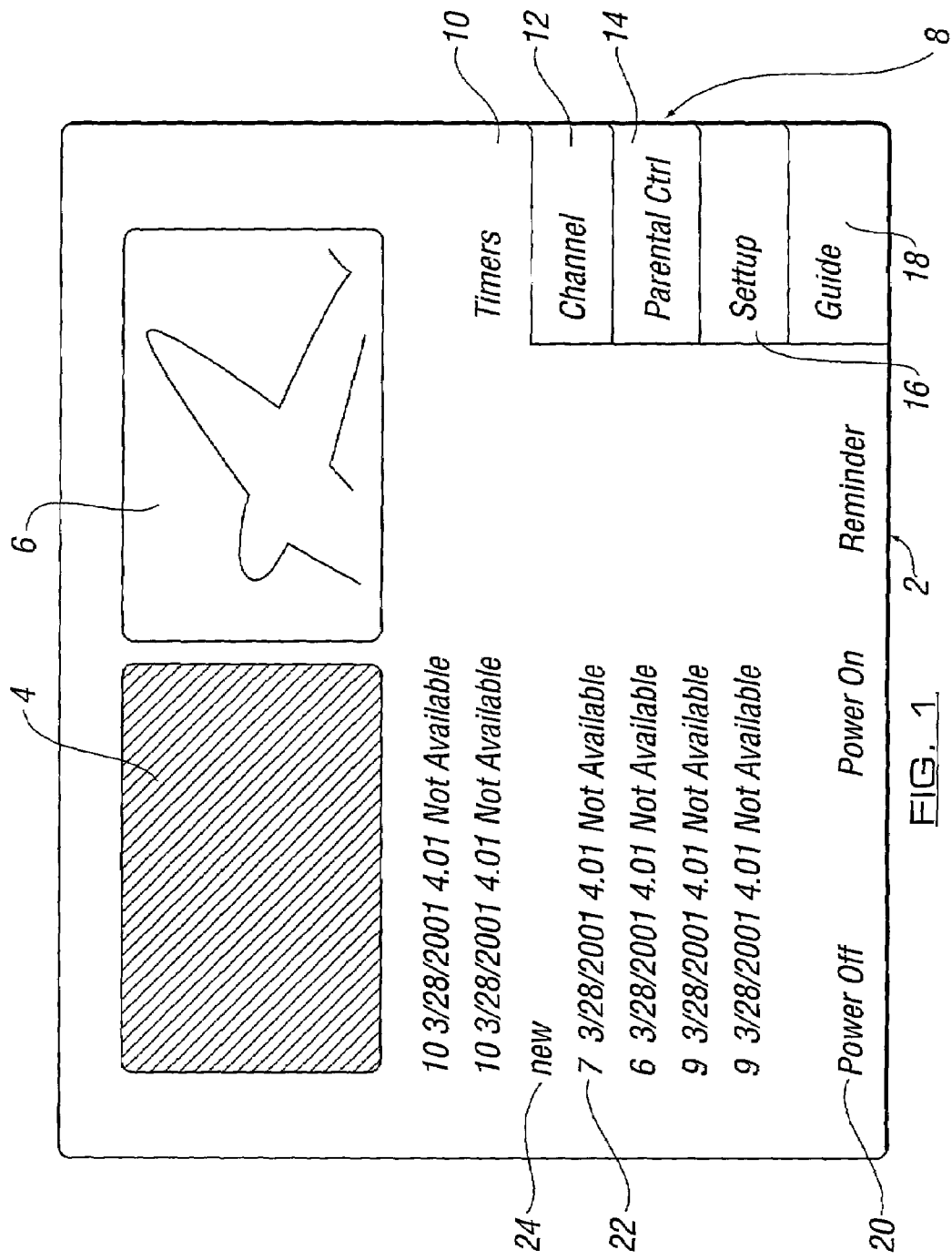
FIG. 1 is an example of a display containing five separate windows forming a single layer on the display screen.

Referring to the figures there is illustrated a display 2 provided on a display screen 3 of a television system. The television system comprises a BDR 5 connected to the display screen 3. The display 2 is composed of five separate windows; an information window 4, a preview window (PIP window) 6, a tab window 8 containing user selectable options including timer tab 10, channel tab 12, parental control tab 14, set-top tab 16 and EPG tab 18, a bookmark window 20 containing the options of power off, power on and reminder, and the list window 22. The five windows form a single display layer on the display screen in that substantially all the windows are simultaneously viewable by a user at any one time.

In one example, the user selects an option "new" 24 from the list window 22 by pressing a relevant key on the remote control handset forming part of the television system. Conventionally, if the user selection results in a further response being required from the user, most EPGs would create a new pop-up window containing a query or message requiring the user response thereto. The new pop up window is superimposed over the five windows already displayed, thus hiding the same and preventing user selection of the other user selectable options from the list, until an appropriate response is made to the message in the pop up window.

Figure 2:
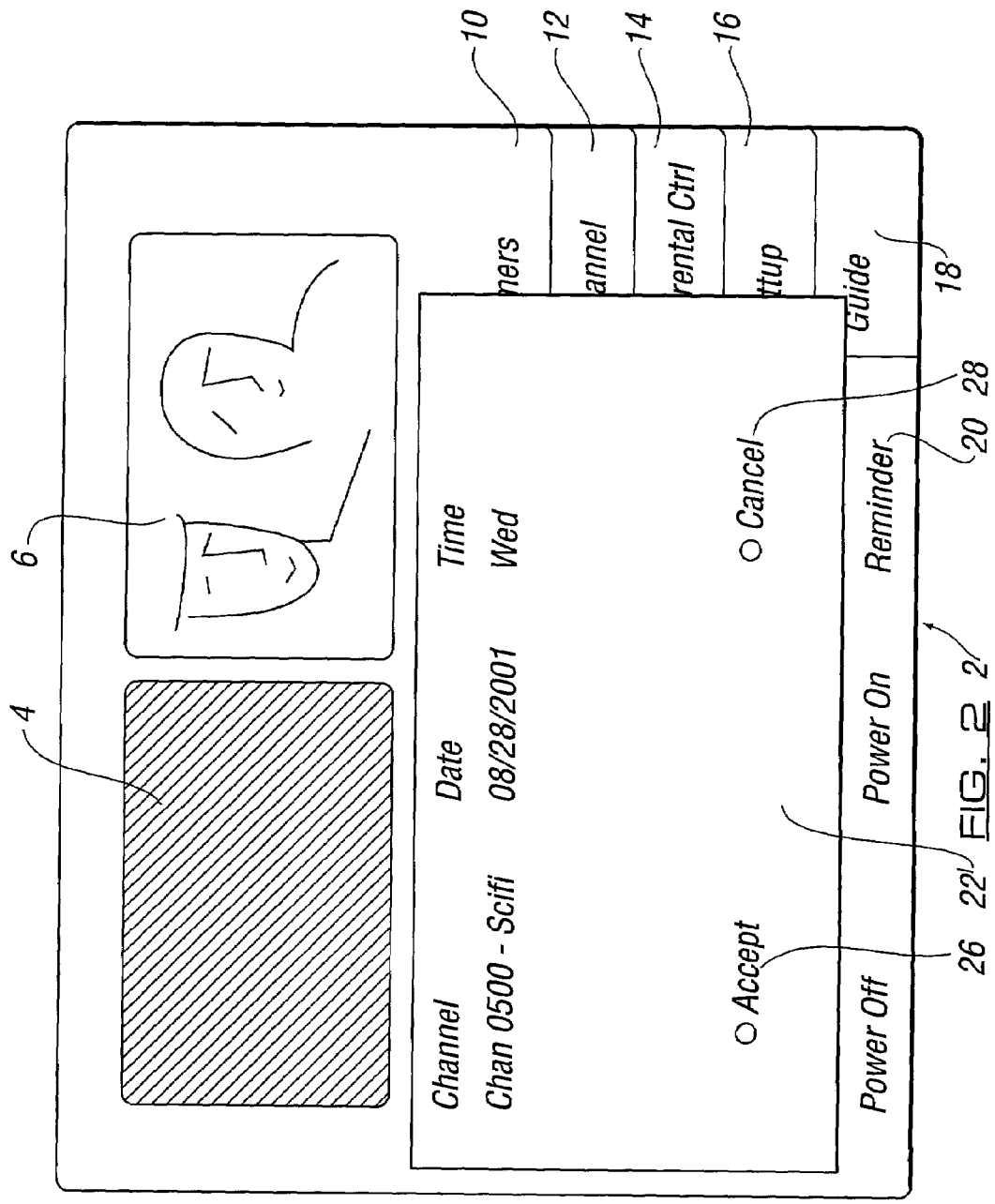
FIGS. 2 and 3 are examples of resizing of a window in FIG. 1 following selection of an option in the window by a user which requires a user response.
Figure 3:
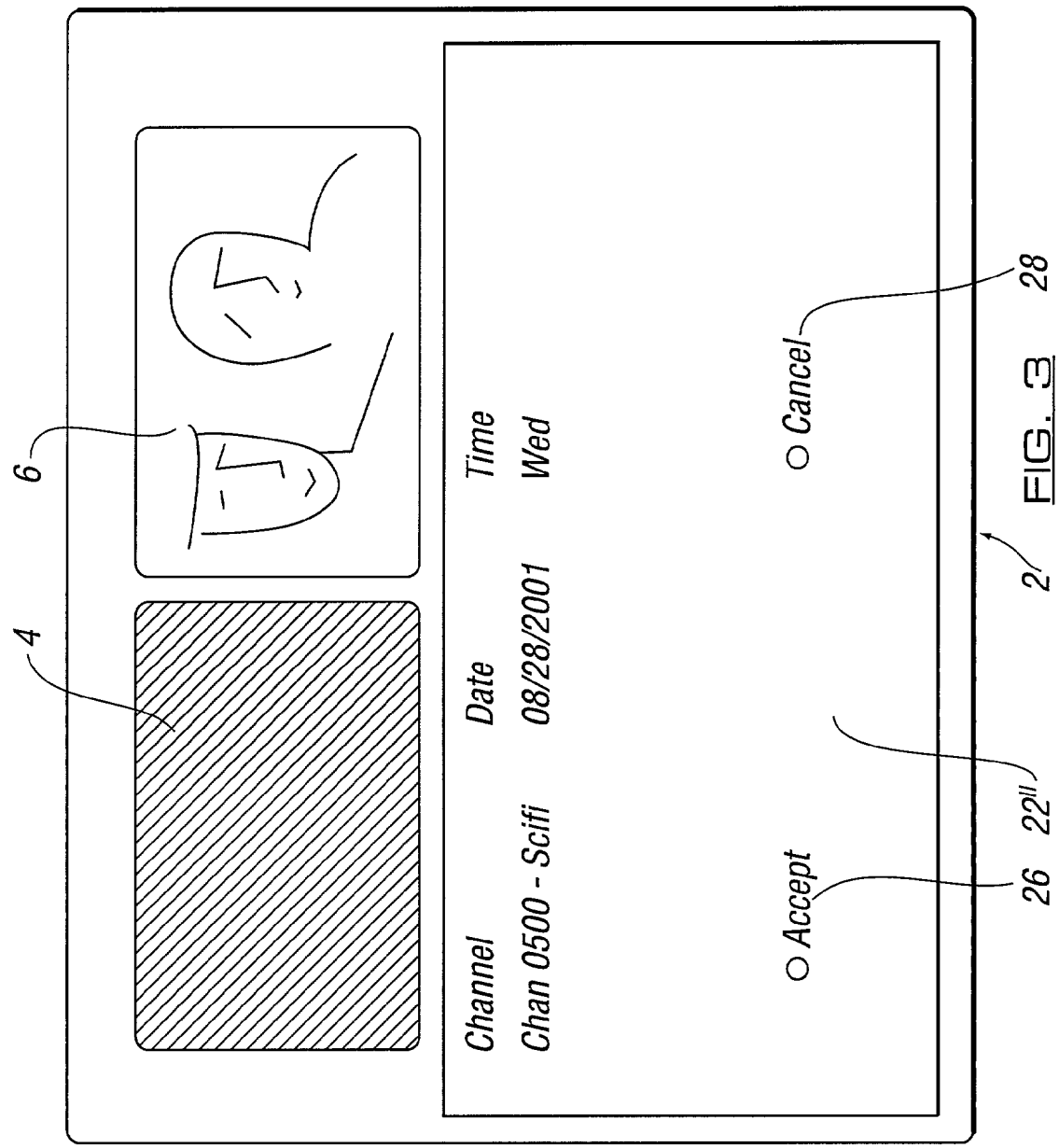
Figure 4:
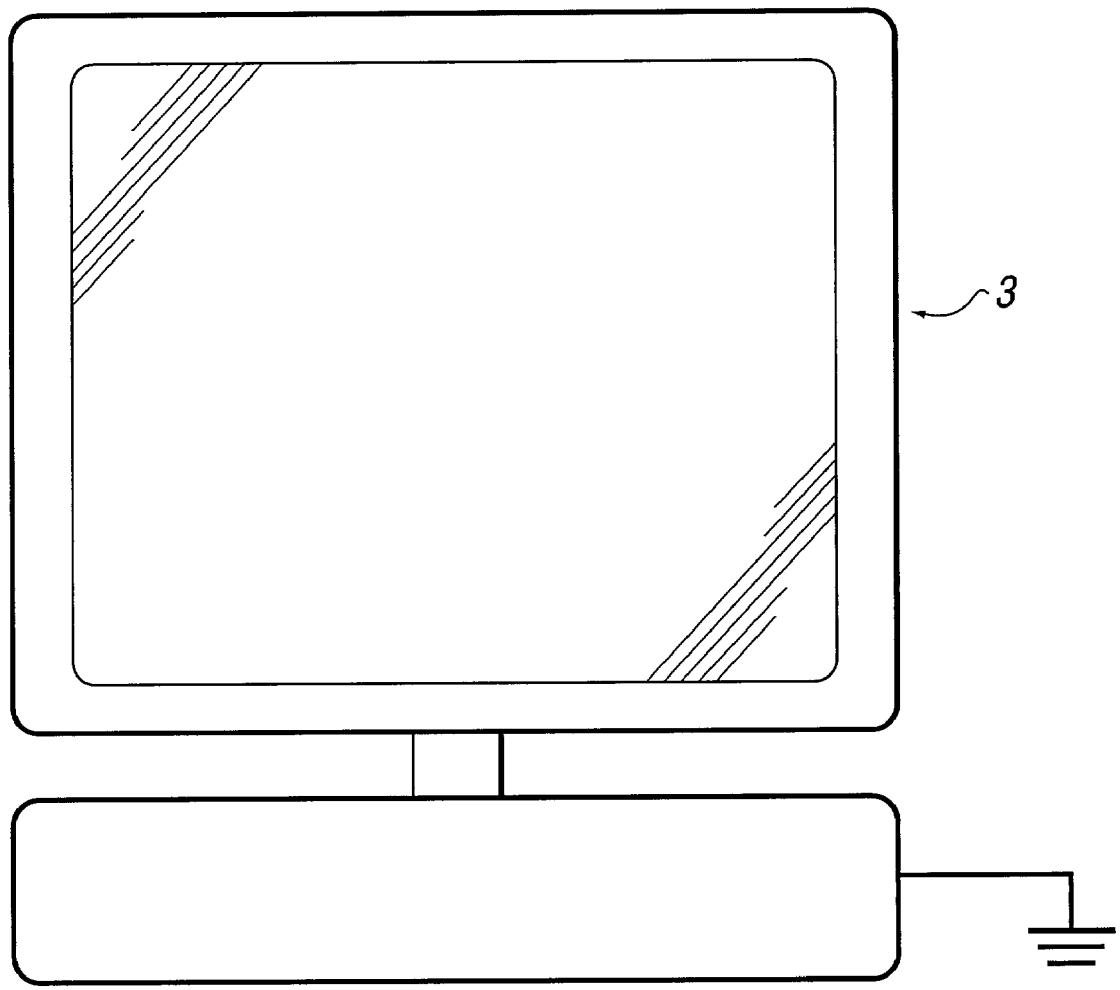
FIG. 4 illustrates the apparatus of a television system according to an embodiment of the present invention.

In accordance with the present invention, once a user has made a selection from a window, i.e., selects option 24 from the list window 22 in FIG. 1, the portion of the window containing the selected option 24 is resized in a series of expansions or enlargements, shown as 22' and 22" in FIGS. 2 and 3 respectively. As the window is expanded, a message appears in the resized portion of the window which requires a user's response thereto. In the illustrated example, the user is required to respond to the message by selecting the accept option 26 or cancel option 28 for a particular program.

Expansion of the window 22 covers the bookmark window 20 and the tab windows 8, thereby preventing user selection of any further options contained therein until one of options 26 and 28 is selected.

The message appearing on the display screen, to which a user is required to respond, can be generated by the BDR during or after resizing of the window containing the message. Alternatively the message can be already provided in the window but be hidden by an overlapping or an adjacent window, user selectable option or be non-selectable under normal operating conditions. On expansion of the relevant part of the window, the message is revealed to the user.

In a further example, the EPG display comprises three windows; A, B and C (not shown), created by the BDR operating system. Window A is equivalent to the Preview PIP window 6 in FIG. 1. Window B is equivalent to the information graphical area 4 to the left of the preview window 6, and window C is the bottom half of the screen containing the list 22, the bookmarks and the tabs. When the user selects an option from one of the three windows, i.e., window C, such as setting of a reminder for a program, window C is reconfigured/resized such that the graphical areas of window C that offer user selectable options which are not available whilst setting the reminder, are hidden. This temporarily removes the further options for selection by the user, thereby making it clear to the user that in order for them to continue to make further selections, they need to complete the query currently shown in the resized window.

It will be appreciated by persons skilled in the art that the present invention can be applied to any electronic device including a display screen. In addition, the present invention is applicable to any window display and not just electronic program guide (EPG) window displays.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention claimed is:

1. A television system, said system comprising:
    a broadcast data receiver receiving data from a broadcaster at a remote location and decoding said data to form video, audio and/or auxiliary data;
    a display screen connected to or integrally formed with the broadcast data receiver;
    at least first and second windows generated from at least part of said decoded data on the display screen wherein at least one of said first and second windows contains user selectable options and upon user selection of a particular option from said first window, at least a part of at least one of said at least first and second windows is resized, such that a remaining part of said resized window and/or part or whole of said other window(s) is disabled, said resizing taking place in a series of expansions or reductions sufficiently gradual to indicate to a user that other selectable options have temporarily been taken away.

2. A television system according to claim 1 wherein at least one of said first and second windows is reconfigured when the user selected option in the first window results in a further user response being required.

3. A television system according to claim 2 wherein once the further user response has been made, at least one of said at least first and second windows return to its original configuration.

4. A television system according to claim 2 wherein a message or query is generated by said broadcast data receiver which requires a further response from the user.

5. A television system according to claim 4 wherein said message or query is generated by said broadcast data receiver during or after reconfiguration of at least one of said at least first and second windows.

6. A television system according to claim 4 wherein said message or query is already present on said display screen but is hidden or is non-selectable prior to user selection of a particular option by the user.

7. A television system according to claim 1 wherein at least one of said at least first and second windows is reconfigured to cover non-selected options in said at least first and second windows.

8. A television system according to claim 1 wherein said first window having several graphical areas and any one of these graphical areas are reconfigured to cover or hide non-selected options in at least one of said first window and second window.

9. A television system according to claim 1 wherein the whole area of said at least first and second windows is reconfigured.

10. A television system according to claim 1 wherein resizing of at least one of said at least first and second windows is substantially instantaneous following user-selection of a particular option.

11. A television system according to claim 1 wherein resizing of at least a part of said first window includes enlargement of said window.

12. A television system according to claim 1 wherein resizing of at least a part of said second window includes reducing the size of said window.

13. A television system according to claim 10 wherein said first window is enlarged and said at least second window is reduced in size.

14. A television system according to claim 1 wherein said at least part of the video and/or auxiliary data is used to generate an electronic program guide for display on said display screen and said electronic program guide includes said at least first and second windows.

15. A broadcast data receiver, said broadcast data receiver comprising:
    means to receive data from a broadcaster at a remote location and decode said data to form video, audio and/or auxiliary data;
    at least part of said decoded data being used to generate at least first and second windows on a display screen, one or more of said windows containing user selectable options and upon user selection of a particular option from said first window, at least a part of at least one of said first and second windows is resized, such that a remaining part of said resized window and/or a part or whole of said other window(s) is disabled, the resizing taking place in a series of expansions or reductions sufficiently gradual to indicate to a user that other selectable options have temporarily been taken away.

16. An electronic program guide for display on a display screen providing information relating to a number of television programs and/or channels and being generated via a broadcast data receiver which is connected to or integrally formed with the display screen and which receives digital data from a broadcaster at a remote location and decodes the data, at least part of said decoded data being used to generate said electronic program guide, said electronic program guide comprising:
    a plurality of windows containing user selectable options and upon user selection of a particular option from a first window, at least a part of said windows is resized such that a remaining part of said resized window and/or a part or whole of another window(s) is disabled, the resizing taking place in a series of expansions or reductions sufficiently gradual to indicate to a user that other selectable options have temporarily been taken away.

17. A television system according to claim 15 wherein said first window is enlarged and said at least second window is reduced in size.

* * * * *